(12) United States Patent
Kopiev et al.

(10) Patent No.: US 8,904,801 B2
(45) Date of Patent: Dec. 9, 2014

(54) DEVICE AND METHOD FOR CONTROLLING VORTEX STRUCTURES IN A TURBULENT AIR JET

(75) Inventors: Victor Feliksovitch Kopiev, Moscow (RU); Nikolay Nikolayevich Ostrikov, Moscow (RU); Mikhail Yuryevich Zaytsev, Zhukovskiy (RU); Sergey Anatoliyevich Chernyshev, Lyubertsi (RU)

(73) Assignee: Airbus, Blagnac (FR)

( * ) Notice: Subject to any disclaimer, the term of this patent is extended or adjusted under 35 U.S.C. 154(b) by 1252 days.

(21) Appl. No.: 12/741,669

(22) PCT Filed: Nov. 6, 2008

(86) PCT No.: PCT/IB2008/002980
§ 371 (c)(1),
(2), (4) Date: Aug. 16, 2010

(87) PCT Pub. No.: WO2009/060295
PCT Pub. Date: May 14, 2009

(65) Prior Publication Data
US 2010/0326060 A1    Dec. 30, 2010

(30) Foreign Application Priority Data
Nov. 7, 2007   (RU) ............................... 2007141384

(51) Int. Cl.
*F02K 1/00* (2006.01)
*B63H 11/10* (2006.01)
*F02K 1/82* (2006.01)
*F02K 1/34* (2006.01)
*F02K 1/44* (2006.01)

(52) U.S. Cl.
CPC . *F02K 1/44* (2013.01); *F02K 1/827* (2013.01); *F05D 2260/96* (2013.01); *B64D 33/06* (2013.01); *F05D 2260/16* (2013.01)
USPC .......................... 60/770; 181/213; 239/265.19

(58) Field of Classification Search
USPC ........... 181/213; 60/725, 770; 381/71.1, 71.5, 381/94.1; 239/265.19
See application file for complete search history.

(56) References Cited

U.S. PATENT DOCUMENTS

| | | | | |
|---|---|---|---|---|
| 3,644,984 A | * | 2/1972 | Inoue | 29/421.2 |
| 5,752,381 A | * | 5/1998 | Speller | 60/228 |
| 5,784,889 A | * | 7/1998 | Joos et al. | 60/725 |

(Continued)

FOREIGN PATENT DOCUMENTS

| | | |
|---|---|---|
| WO | 98 39209 | 9/1998 |
| WO | 2005 049997 | 6/2005 |

OTHER PUBLICATIONS

"Corona discharge", Internet Citation, [online] pp. 1-8, XP007907352 Retrieved from the Internet: URL:http://en.wikipedia.org/wondex.php?title=Corona_discharge&oldid=2659400> [retrieved on Feb. 24, 2009].

*Primary Examiner* — Gerald L Sung
(74) *Attorney, Agent, or Firm* — Oblon, Spivak, McClelland, Maier & Neustadt, L.L.P.

(57) ABSTRACT

A device controlling vortex structures in a turbulent air jet flowing out of an air exhaust channel, which is constituted by at least one pair of needles connected to an AC voltage source to create a pulsating corona discharge between the needles. One needle is located along and the other across the flow to produce a resonant effect of the pulsating corona discharge on the vortex structures. In a method for controlling vortex structures in a turbulent air jet, at least one pair of needles connected to an AC voltage source create a pulsating corona discharge between the needles. One needle is located along and the other across the flow to produce a resonant effect of the pulsating corona discharge on the vortex structures.

18 Claims, 3 Drawing Sheets

(56) References Cited

U.S. PATENT DOCUMENTS

| | | |
|---|---|---|
| 5,966,452 A | 10/1999 | Norris |
| 6,332,027 B1 * | 12/2001 | Guilloud et al. ............ 381/71.1 |
| 7,334,394 B2 * | 2/2008 | Samimy et al. ............ 60/226.1 |
| 2006/0005545 A1 | 1/2006 | Samimy et al. |

* cited by examiner

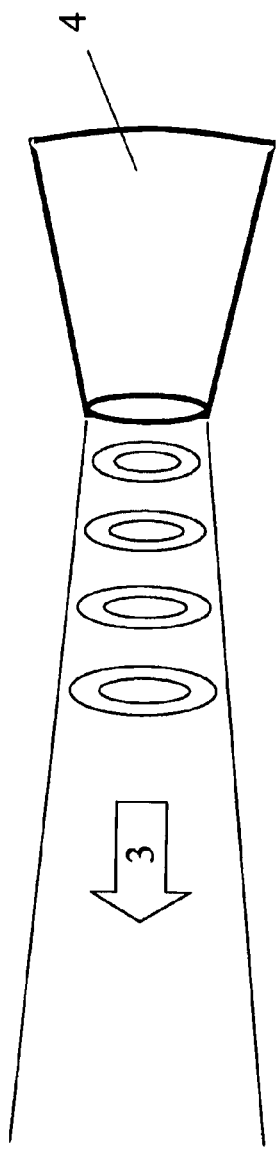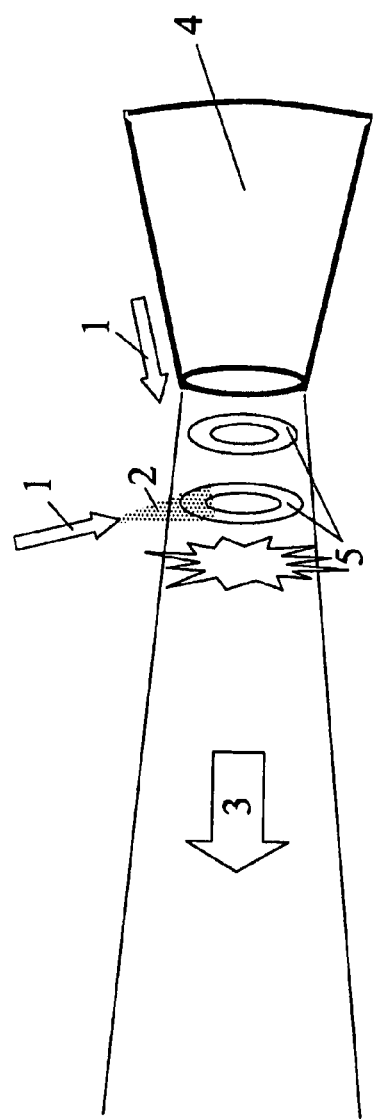

DEVICE AND METHOD FOR CONTROLLING VORTEX STRUCTURES IN A TURBULENT AIR JET

BACKGROUND

The invention involves a device and method for controlling vortex structures in a turbulent jet and therefore decreasing the noise generated by the turbulent flow.

Noise in turbulent air flows is a common problem in various areas of engineering. It is especially acute in aircraft engineering where multiple sources contribute to aircraft noise: the propulsion system (e.g. fan, jet, etc.) and the airflow along aerodynamic elements of the airframe. A comprehensive approach dealing with different noise sources is required to achieve drastic noise reduction (fan noise, airframe noise, etc.). The invented device is intended to decrease the jet noise by controlling vortex structures in a turbulent air flow.

Intensive development of aircraft engineering and the advent of a new generation of passenger aircraft have led to a dramatic increase in powerful noise sources affecting the human being. The engine exhaust jet has been the primary noise source ever since the first jet passenger airliners were built in the 1950s. The application of by-pass turbo-jet engines has helped improve the aircraft's acoustic performances but the unrelenting attempts of international organizations to impose increasingly stringent requirements on the existing and future aircraft call for more intensive efforts in terms of noise reduction. The strategic goal of the forthcoming 7$^{th}$ European program in aero-acoustics is to develop basic provisions and preliminary proposals for thorough improvement of the aircraft acoustic characteristics by 2010 and to devise technology solutions and well-grounded recommendations for their implementation in the aircraft industry by 2020. A balanced approach tackling different noise sources is required to achieve further reduction of noise (fan noise, airframe noise, etc.), but nevertheless the jet noise seems to remain a stumbling block in dealing with this complex task. Besides, the jet noise remains the dominating noise source and a major obstacle for further evolution of supersonic aircraft. Therefore an acute need is felt at present for putting forward new ideas including those that are based on attempts to ensure active turbulent jet noise control in addition to the development of conventional approaches to the aircraft engine noise reduction problem.

Active turbulent jet control is still at an embryo phase of development and requires improvements in the excitation system (actuators), control algorithms and measurement instruments in order to fully exploit its rich potential. All the actuators, such as glow discharge exciters, liquid injection, Helmholtz resonators and MEMs hold a lot of promise as effective flow control instruments. It is essential to find a solution that would be both technically feasible and cost-effective.

A few design solutions that might be helpful in creating actuators for active turbulent flow control are cited below:

Para-electric actuators in which the plasma of the glow or barrier discharge is used for generating the flow velocity field in the boundary layer. In these actuators, the electric field gradient causes ion acceleration that brings into play the main medium due to particle collisions (see Roth, J. R.; Sherman, D. M.; and Wilkinson, S. P. 1998: Boundary Layer Flow Control With One Atmosphere Uniform Glow Discharge Surface Plasma. AIAA-98-0328.);

Piezoelectric actuators for flow manipulation that are governed by periodical tension which makes them oscillate. The diaphragm oscillations push the air in and out through an opening (slot or hole) that connects the cavity with the environment (this flow has been called a "synthetic jet") (see Wiltse, J. M.; and Glezer, A. 1993: Manipulation of Free Shear Flows Using Piezoelectric Actuators. J. Fluid Mech., vol. 249, pp. 261-285);

Vortex-generating jets or pulsating vortex generators that are formed by oscillating fluid impulses injected through the opening at an angle. These vortexes pick up the separated flow and thus improve the operation of aerodynamic devices (see Magill, J. C.; and McManus, K. R. 1998: Control of Dynamic Stall Using Pulsed Vortex Generator Jets. AIAA-98-0675);

Corona discharge actuators which use an ion wind generated by the charged particles acceleration near the positive and negative corona points (see Danna A. Lacoste, David Pai, and Christophe O. Laux, "*Ion wind effects in a positive dc corona discharge in atmospheric pressure*" AIAA 2004-354, 2005. T. R. Troutt, D. K. Mc Laughlin, "*Experiments on the flow and acoustic properties of a moderate Reynolds number supersonic jet*", J. Fluid Mech., 116, 123-156 (1982)).

However, the problem grows much more complicated if the investigation has to deal with noise control and not only flow control.

BRIEF SUMMARY

Large vortexes play a significant role in the overall turbulent jet noise radiation. Therefore, the main purpose of the invention is to control these vortexes using a simple technique and develop simple and inexpensive tools to implement it.

Vortex rings generated in the turbulent air flow have a vortex nucleus formed as a fluctuating system with a multitude of eigen oscillations differing in frequency and the near field shape and structure.

Numerous attempts have been made till now to suppress noise in turbulent air. However, the most common result is a suppression device that has strongly affects the engine's thrust performances.

The main idea of this invention is to influence vortex rings in a jet by producing resonant excitation of the vortex nucleus without touching the jet flow and hence without affecting the jet's thrust characteristics.

The effect can be achieved by using the device capable of suppressing vortex structures in a turbulent air jet flowing out of the air exhaust channel. The device proposed in this invention contains at least one pair of needles connected to an AC voltage source to generate a pulsating corona discharge between the needles. One needle is aligned with the flow and the other is directed across the flow to provide a resonant effect of the corona discharge on the vortex structures. The pulsating corona discharges form pulsating micro-jets as the charged ions accelerated by the electric field periodically bring gas particles into the jet.

The pair of needles is located in direct proximity to the flow.

Besides, the method of influencing the vortex structures in a turbulent air jet as presented in the invention suggests that at least one pair of needles is connected to an AC voltage source to produce a pulsating corona discharge between the needles. One needle is placed along and the other across the flow, which results in a resonant effect of the pulsating corona discharge on the vortex structures.

The pair of needles is placed close to the flow.

Preferably, the device should contain two, four or six pairs of needles. The needles can be made of steel or copper. The invented device can be applied in the propulsion system of the aircraft engine.

BRIEF DESCRIPTION OF THE DRAWINGS

The device is described in detail below, with references to the attached drawings, where:

FIGS. 2 and 3 feature the vortexes moving in a turbulent flow without and with the invented device respectively;

DETAILED DESCRIPTION

Figure 1:
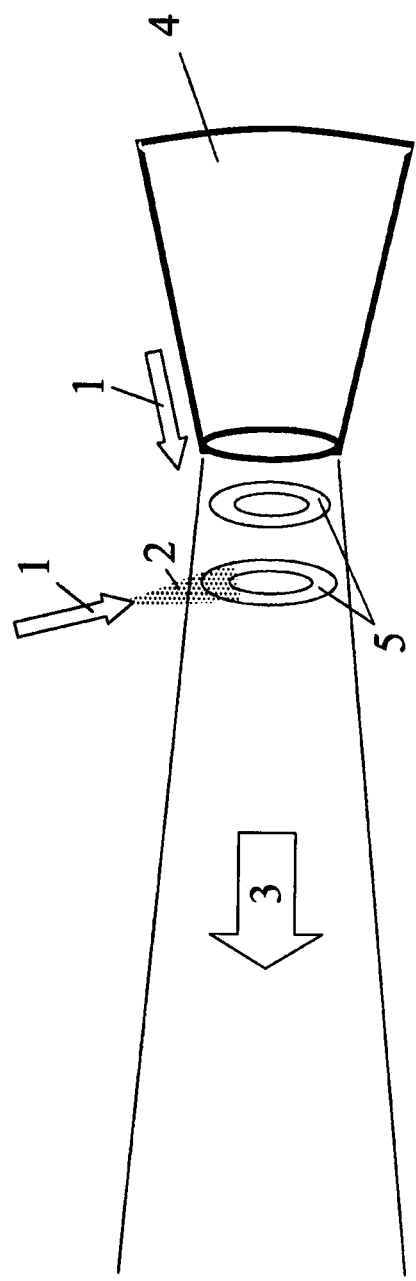
FIG. 1 is a schematic view of the pair of needles and its location.

As can be seen from FIG. 1, the pair of needles (1) affecting the vortex structures forming in turbulent environment (further vortexes (5)) is located close to the turbulent air jet (3) flowing out of the nozzle (4). According to one embodiment, the distance between the needles and the flow is in the range between 0.5 mm and 5 mm and preferably between 1 mm and 2 mm. The needles (1) are connected to an AC high voltage source (not shown) generating nearly rectangular positive high-voltage pulses of the meander type, with a half-period phase shift between the channels.

A pulsating corona discharge forming micro-jets (2) flowing along the needle is generated on the needle (1) points. One needle (1) is an anode and the other one is a cathode. A micro-jet is a pulsating flow which is reproduced during the first half-period under the high-voltage pulse effect and ceases completely in the second half-period when there is no difference of potentials between the needles. The micro-jet consists of vortex bunches forming at the beginning of each period at about 2 mm from the needle point and moving at 5-6 m/sec. When needles are connected to the high-voltage pulse generator by a two-way circuit with a half-period phase shift, they independently produce pulsating micro-jets in each channel. Altogether, the parameters of the micro-jet flow provide the required characteristics of influencing the excited turbulent jets. The micro-jet (2) displays the maximum velocity near the needle (1) with a positive corona discharge. It is this needle (1) that should be used as an effective vortex suppressor. A high pulsating frequency should be selected to ensure a resonant effect on the vortexes (5). It should be noted that micro-jets can have a noticeable resonant effect on the vortexes (5) if the velocity amplitude is above 2 m/sec, the frequency is 1000 Hertz, the distance to the vortex is about 1 cm and the needles (1) are arranged correctly. The concrete parameters of the operating system depends upon concrete parameters as turbulent jet and vortex rings and are chosen to destroy the vortex rings in turbulent jet.

Figure 4:
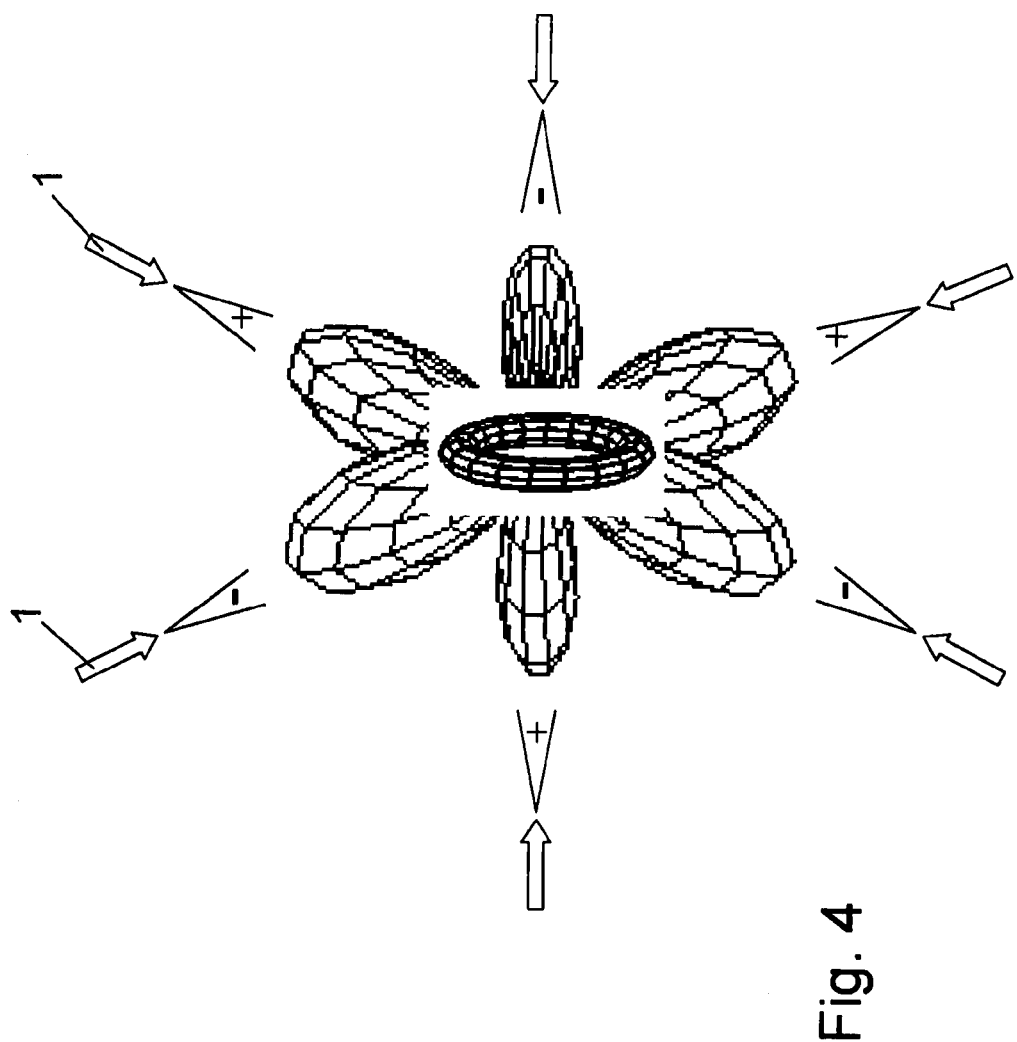
FIG. 4 shows the device with the pair of needles located so as to produce the resonant effect on the vortexes in the flow.

The invented device design enables using one pair of needles (1) as shown in FIG. 1, or two, three or even more pairs (1) as shown in FIG. 4 (three pairs). It has been found that such configurations provide the required resonant effects on excited turbulent jets. Furthermore, intensive destruction of vortex rings or vortexes (5) occurs under the influence of pulsating corona discharge micro-jets in a wide range of flow velocities V: from 12 m/sec to 30 m/sec.

It should be emphasized that steady micro-jets do not break up the vortex rings which can be destroyed by the pulsating micro-jets only.

FIGS. 2 and 3 illustrate the vortexes (5) moving in turbulent environment in the absence of the pulsating corona discharge (see FIG. 2) and in the case the vortexes (5) are suppressed by the pulsating micro-jets in the initial part of the jet coming out of the nozzle (4) (see FIG. 3).

The optimum distance between the anode and cathode needle points is about 20 mm at a discharge voltage not exceeding 23 kW. The optimum distance between the first and second pair of needles (in the direction of the flow) has turned out to be approximately 25 mm. In all cases where the system settings were different from the optimum, the vortex rings remained intact after passing the anode needles' influence area. On the other hand, the vortex rings got destroyed once the system parameters were set at the optimum: the vortexes passed through the first pair of cathode needles on the nozzle, reached the second pair of anode needles and disappeared.

Although the invented device and method are presented here in the form of preferable implementations, the experts in this area of engineering should be aware of a wide diversity of changes and modifications encompassed in this invention.

The invention claimed is:

1. A device for controlling vortex structures in a turbulent jet flowing out of an exhaust nozzle of a propulsion system of an aircraft engine, the exhaust nozzle having a longitudinal axis, the device comprising:
   at least one pair of needles connected to an AC voltage source to create a pulsating corona discharge between the needles, wherein
   one needle of the at least one pair of needles has a length along a longitudinal axis of the one needle, the longitudinal axis of the one needle being arranged in a direction substantially parallel to the longitudinal axis of the exhaust nozzle, and
   the other needle of the at least one pair of needles has a length along a longitudinal axis of the other needle, the longitudinal axis of the other needle being arranged in a direction substantially perpendicular to the longitudinal axis of the exhaust nozzle, the at least one pair of needles being arranged to produce a resonant effect of the pulsating corona discharge on the vortex structures.

2. The device according to claim 1, in which said pair of needles is located in close proximity to the flow.

3. The device according to claim 2, in which said pair of needles is located at a distance between 1 mm and 2 mm from the flow.

4. The device according to claim 1, containing two pairs of needles.

5. The device according to claim 1, containing four pairs of needles.

6. The device according to claim 1, containing six pairs of needles.

7. The device according to claim 1, with needles made of steel or copper.

8. The device according to claim 1, in which a distance between anode and cathode needle points of said pair of needles is about 20 mm.

9. The device according to claim 4, in which a first pair of the two pairs of needles is separated from a second pair of the two pairs of needles by approximately 25 mm.

10. A method for controlling vortex structures in a turbulent jet flowing out of an exhaust nozzle of a propulsion system of an aircraft engine, the exhaust nozzle having a longitudinal axis, the method comprising:
   creating, with at least one pair of needles connected to an AC voltage source, a pulsating corona discharge between the needles, wherein
   one needle of the at least one pair of needles has a length along a longitudinal axis of the one needle, the longitudinal axis of the one needle being arranged in a direction substantially parallel to the longitudinal axis of the exhaust nozzle, and
   the other needle of the at least one pair of needles has a length along a longitudinal axis of the other needle, the longitudinal axis of the other needle being arranged in a direction substantially perpendicular to the longitudinal axis of the exhaust nozzle, the at least one pair of needles being arranged to produce a resonant effect of the pulsating corona discharge on the vortex structures.

11. The method according to claim 10, in which the pair of needles is located in close proximity to the flow.

12. The method according to claim 11, in which the pair of needles is located at a distance between 1 mm and 2 mm from the flow.

13. The method according to claim 10, using two pairs of needles.

14. The method according to claim 10, using four pairs of needles.

15. The method according to claim 10, using six pairs of needles.

16. The method according to claim 10, using needles made of steel or copper.

17. The method according to claim 10, in which a distance between anode and cathode needle points of said pair of needles is about 20 mm.

18. The method according to claim 13, in which a first pair of the two pairs of needles is separated from a second pair of the two pairs of needles by approximately 25 mm.

* * * * *